United States Patent
Krus et al.

(10) Patent No.: US 9,817,514 B2
(45) Date of Patent: Nov. 14, 2017

(54) TOUCH-SENSING APPARATUS AND A METHOD FOR ENABLING CONTROL OF A TOUCH-SENSING APPARATUS BY AN EXTERNAL DEVICE

(71) Applicant: FlatFrog Laboratories AB, Lund (SE)

(72) Inventors: Mattias Krus, Lund (SE); Mats Petter Wallander, Lund (SE); Ivan Karlsson, Lund (SE)

(73) Assignee: FLATFROG LABORATORIES AB, Lund (SE)

( * ) Notice: Subject to any disclaimer, the term of this patent is extended or adjusted under 35 U.S.C. 154(b) by 206 days.

(21) Appl. No.: 14/758,081

(22) PCT Filed: Dec. 23, 2013

(86) PCT No.: PCT/SE2013/051615
§ 371 (c)(1),
(2) Date: Jun. 26, 2015

(87) PCT Pub. No.: WO2014/104968
PCT Pub. Date: Jul. 3, 2014

(65) Prior Publication Data
US 2015/0363042 A1     Dec. 17, 2015

Related U.S. Application Data

(60) Provisional application No. 61/746,319, filed on Dec. 27, 2012.

(30) Foreign Application Priority Data

Dec. 27, 2012 (SE) ..................... 1251516

(51) Int. Cl.
G06F 3/042     (2006.01)
G06F 3/041     (2006.01)
(Continued)

(52) U.S. Cl.
CPC .............. *G06F 3/0418* (2013.01); *G06F 1/16* (2013.01); *G06F 3/0421* (2013.01);
(Continued)

(58) Field of Classification Search
None
See application file for complete search history.

(56) References Cited

U.S. PATENT DOCUMENTS 8,094,129 B2    1/2012   Izadi et al.
8,138,479 B2    3/2012   Kothari et al.
(Continued)

FOREIGN PATENT DOCUMENTS

WO    WO-2008/121908 A1    10/2008
WO    WO-2011/049513 A1    4/2011

OTHER PUBLICATIONS

International Search Report and Written Opinion dated Apr. 11, 2014 issued in corresponding International Application No. PCT/SE2013/051615.

*Primary Examiner* — Carolyn R Edwards
*Assistant Examiner* — Bipin Gyawali
(74) *Attorney, Agent, or Firm* — Harness, Dickey & Pierce, P.L.C.

(57) ABSTRACT

Invention principally regards a remotely controllable touch-sensing apparatus. The apparatus comprises a planar light guide, a plurality of light emitters arranged to emit light into the light guide for propagation by total internal reflection inside the light guide, and a plurality of light detectors, each being arranged to detect at least a portion of the emitted light propagating inside the light guide and at least a portion of the ambient light, said detectors being distributed along the periphery of the touch surface such that the optical plane of detection of light coincides with the plane of the light guide, at least one of said detectors being adapted to detect light emitted by an external device configured to emit light. The apparatus also comprises a processor unit configured to, ultimately, generate a digital signal containing data regarding light generated by the external device. Invention also (Continued)

regards a method for enabling control of a touch-sensing apparatus by an external device.

13 Claims, 6 Drawing Sheets

(51) Int. Cl.
    *G08C 23/04*     (2006.01)
    *G06F 1/16*     (2006.01)
    *G06F 3/14*     (2006.01)

(52) U.S. Cl.
    CPC .............. *G06F 3/0428* (2013.01); *G06F 3/14* (2013.01); *G08C 23/04* (2013.01); *G06F 2203/04109* (2013.01)

(56) References Cited

U.S. PATENT DOCUMENTS

| | | |
|---|---|---|
| 8,269,746 B2 | 9/2012 | Hodges et al. |
| 8,368,663 B2 | 2/2013 | Izadi et al. |
| 2003/0107748 A1* | 6/2003 | Lee ...................... G06F 3/0325 356/614 |
| 2006/0038698 A1* | 2/2006 | Chen ...................... G08C 23/04 340/12.22 |
| 2006/0290683 A1 | 12/2006 | Pasquariello et al. |
| 2006/0290684 A1 | 12/2006 | Giraldo et al. |
| 2008/0122792 A1* | 5/2008 | Izadi ...................... G06F 3/0421 345/173 |
| 2008/0122803 A1 | 5/2008 | Izadi et al. |
| 2008/0151126 A1* | 6/2008 | Yu ...................... H04N 5/4403 348/734 |
| 2009/0066647 A1* | 3/2009 | Kerr ...................... G06F 3/0346 345/158 |
| 2009/0161026 A1* | 6/2009 | Wu ...................... H04N 5/4403 348/734 |
| 2010/0187422 A1 | 7/2010 | Kothari et al. |
| 2012/0026408 A1* | 2/2012 | Lee ...................... H04N 5/4403 348/734 |
| 2012/0075256 A1 | 3/2012 | Izadi et al. |
| 2012/0161009 A1 | 6/2012 | Kothari et al. |
| 2012/0212441 A1* | 8/2012 | Christiansson ....... G06F 3/0416 345/173 |

\* cited by examiner

PRIOR ART

PRIOR ART

PRIOR ART

TOUCH-SENSING APPARATUS AND A METHOD FOR ENABLING CONTROL OF A TOUCH-SENSING APPARATUS BY AN EXTERNAL DEVICE

CROSS-REFERENCE TO RELATED APPLICATIONS

This application is a national phase under 35 U.S.C. §371 of PCT International Application No. PCT/SE2013/051615 which has an International filing date of Dec. 23, 2013, which claims priority to Sweden patent application number SE 1251516-9 filed Dec. 27, 2012 and U.S. provisional patent application No. 61/746,319 filed Dec. 27, 2012.

TECHNICAL FIELD

The disclosure principally relates to a remotely controllable touch-sensing apparatus based on frustrated total internal reflection of light propagating in a light guide acting as a touchable surface.

BACKGROUND

Devices with touch sensitivity, typically combined with picture reproducing elements such as displays, are today used in a wide variety of applications such as touch pads in laptop computers, all-in-one computers, mobile phones and other hand-held and stationary devices.

There are numerous techniques for providing a device of the above kind with touch sensitivity, e.g. by adding layers of resistive wire grids or layers for capacitive touch-sensing. WO2008121908 discloses a system based on proximity sensing. Accordingly, the system comprises a touch panel where touch sensitivity is provided by internally emitted IR-light being reflected by e.g. a finger positioned on the touchable surface of the panel. Applicant's own international patent application WO2011049513 discloses a touch sensing system that uses frustrated total internal reflection (FTIR) to detect touching objects. More specifically, light emitted by a light source as well as ambient light is coupled into a light guide. This light then propagates inside the light guide by total internal reflection where after the transmitted light is received at an array of light detection points. The light may be disturbed (frustrated) by an object, such as a finger or a stylus, touching the light guide that acts as a touchable surface. This results in attenuation of the light signal, i.e. light intensity drops. This attenuated light is sensed at certain light detection points. The detected light is subsequently used to calculate different parameters associated with the object touching the guide.

Analogously to a conventional TV-set, it is often necessary to adjust different control parameters, such as brightness or contrast, of the device with touch sensitivity in order to enhance reproduction of the displayed picture. To this purpose, a plurality of dedicated buttons is normally provided on the device. Alternatively, said parameters may be adjusted by using a remote control (contracted "remote"), typically emitting signals in the infrared (IR) light range between 800 nm and 1000 nm. As an alternative, as implemented in the early days of the remote, visible light may be used to control the device.

Control signal emitted by the remote held by a user is received by a suitable sensor integrated in the device. Since remote signals require clear sight between sender and receiver and the user normally is positioned so as to see the display, i.e. the front side of the device, itself, said sensor is usually integrated in the frame of the display device so that the sensor eye faces the user. However, given the continuous quest for ever more reduced frame dimensions associated with devices with touch sensitivity, it is often undesirable to position the sensor on the front side of the device. Moreover, it is often perceived as aesthetically displeasing to position the sensor so that it may be freely seen by the users.

For these reasons, latest generation of display devices with touch sensitivity based on FTIR as disclosed in WO2011049513 have a sensor (an IR-sensor) positioned on the back side of the device. Front side as well as back side that shows the IR-sensor of such a device may be seen in FIGS. 1a and 1b, respectively. Such a solution is satisfactory at least in applications where frequent adjustment of control parameters is not required.

Another intrinsic property of the above-described control systems is the necessity to, in use, aim the remote rather precisely at the sensor eye. Obviously, from the user's perspective, this constraint is undesirable.

Further drawback of the conventional control systems is their sensitivity to external circumstances. More specifically, in case of the sensor being accidentally covered or soiled, the entire system becomes stripped of the remote functionality. Same is true in case of sensor breakage.

Previously mentioned WO2008121908 discloses, on a rather general and theoretical level, a touch sensitive system being remotely controllable without employment of a dedicated sensor. Even if the general knowledge in the field is taken into account, it is still unclear how the disclosed technical teaching should be practiced in order to achieve a functioning touch-sensitive system that also is remotely controllable without employment of a dedicated sensor.

Notwithstanding the above, WO2008121908 relates to a system comprising a touchable surface and an array of IR-sensors positioned at a distance from and parallel to the touchable surface. These sensors detect IR-light reflected from the object positioned above the touchable surface. This reflected light is, during its propagation in the interior of the device, scattered by the internal components, the functionality of the device thus becoming severely impaired.

Furthermore, WO2008121908 mentions, in a rather speculative fashion, a possibility of integrating a light guide into the touch panel by positioning it so that it guides light towards touchable surface. Nevertheless, in such a set-up, the array of IR-sensors would remain positioned at a distance from and parallel to the touchable surface and the light guide why the light that is detected by said IR-sensors cannot be the attenuated light that characterizes FTIR. On the contrary, such a set-up would result in detection of an intensified light signal, due to the fact that the object positioned on the touchable surface becomes a diffusive light source.

One objective of the present invention is therefore to provide an improved device with touch sensitivity that eliminates at least some of the drawbacks associated with the current art.

SUMMARY

The above stated objective is achieved by means of an inventive concept comprising a plurality of interrelated products. More specifically, the invention comprises a remotely controllable touch-sensing apparatus and a thereto complementing touch-sensing apparatus adapted to transmit light in order to remotely control a device as well as an apparatus that in a single entity unites these two functionalities. Furthermore, the inventive concept encompasses a method for enabling control of a touch-sensing apparatus by an external device and a computer-usable medium comprising a computer program code configured to cause a processor unit to execute said method.

In the above context, a first aspect of the present invention, as claimed in independent claim 1, provides a remotely controllable touch-sensing apparatus, comprising a planar light guide having a first face that is exposed to ambient light such that ambient light passes into the guide and a second, thereto opposite face, said planar light guide defining a touch sensing surface. Here, it is to be noted that a contamination of the touch sensing surface normally may allow for scattering of the ambient light into the light guide to take place such that the scattered ambient light propagates via total internal reflection, although scattering is not required for the ambient light to enter the panel. The apparatus further comprises a plurality of light emitters arranged to emit light into the light guide for propagation by total internal reflection inside the light guide, and a plurality of light detectors, each being arranged to detect at least a portion of the emitted light propagating inside the light guide and at least a portion of the ambient light, said detectors being distributed along the periphery of the touch surface such that the optical plane of detection of light coincides with the plane of the light guide, wherein at least one of said detectors is adapted to detect light emitted by an external device configured to emit light, said at least one detector further is adapted to, in response to said detected light, generate at least one electrical signal. The apparatus further comprises a processor unit configured to sample said electrical signal such that a sampled signal is obtained, said sampled signal comprising a first time series containing data regarding ambient light and regarding light generated by the external device and a second time series containing data regarding touch information generated by contact with the touch sensing surface, regarding ambient light and regarding light generated by the external device. The processor unit is further configured to either simultaneously or sequentially extract and improve data regarding touch information generated by contact with the touch sensing surface such that a third time series containing essentially only data regarding touch information generated by contact with the touch sensing surface is obtained, generate a first digital signal. The processor unit is also configured to reduce ambient light component of the first time series such that a fourth time series essentially containing only data regarding light generated by the external device is obtained and generate a second digital signal from the obtained fourth time series, said signal containing data regarding light generated by the external device.

In a second aspect of the present invention a method for enabling control of a touch-sensing apparatus by an external device is provided. In particular, said method comprises the steps of:

detecting a light signal,
establishing a sampling scheme that measures at least internally generated light containing touch information generated by contact with a touch sensing surface of the apparatus and ambient light, wherein said sampling scheme defines timing of a touch sample characterizing the generated touch information and a background sample characterizing ambient light, said apparatus and said sampling scheme being suitable for sampling at the carrier frequency of the external device,
generating at least one electrical signal at least comprising data regarding the internally generated light containing touch information generated by contact with the touch sensing surface, ambient light and light generated by the external device,
sampling said electrical signal by means of the sampling scheme such that a sampled signal is obtained, said sampled signal comprising a first time series containing data regarding ambient light and regarding light generated by the external device and a second time series containing data regarding touch information generated by contact with the touch sensing surface, regarding ambient light and regarding light generated by the external device,
extracting and improving data regarding touch information generated by contact with the touch sensing surface by using the first time series such that a third time series essentially containing only data regarding touch information generated by contact with the touch sensing surface is obtained,
generating a first digital signal,
reducing ambient light component of the first time series such that a fourth time series essentially containing only data regarding light generated by the external device is obtained,
generating a second digital signal from the obtained fourth time series, said signal containing data regarding light generated by the external device,
determining the information content of the light signal generated by the external device using data contained in said second digital signal.

In the following, positive effects and advantages of the invention at hand are presented with reference to the first and the second aspects of the invention.

From the above it is easily apprehended that, by virtue of the present invention, existing system components, i.e. detector(s) normally used for capturing light signals propagating in the light guide in accordance with FTIR, may also be used for detecting light emitted by an external device. Accordingly, a dedicated sensor used to establish remote-control-functionality is hereby rendered superfluous.

Putting the above in a more concentrated form, the detector(s), in response to detecting light signals propagating in the light guide, generate(s) an electrical signal comprising data regarding touch information attributable to external physical contact made with the touch sensing surface, e.g. by means of finger or stylus, scattered ambient light, i.e. ambient light scattered into the light guide and propagating therein and light signal emitted by the external device, such as a remote control. This data is subsequently used to, ultimately, determine the information content of the light signal emitted by the external device.

It is thus clear that the present invention obviates the need for integrating a dedicated sensor in order to render FTIR-based touch-sensing apparatus remotely controllable. Positive effects resulting thereof are numerous. More specifically, providing a sensor eye that is clearly visible for the user, something that disrupts aesthetical appearance of the apparatus, may be dispensed with. Further obvious benefits deriving herefrom are, to name a few, reduced overall manufacturing cost as well as simplified design of the apparatus. Also, valuable space that hitherto was allocated for the sensor is now made available for other components. In the same context, by virtue of the present invention, a user desiring to remotely control the apparatus does not need not to take into consideration the position of the sensor eye. Instead, it is sufficient to aim in the general direction of the apparatus. Effectively, entire surface of the light guide becomes susceptible for the remote signal. Furthermore, robustness, i.e. availability of the remote-control-functionality, of the apparatus is greatly improved. In other words, the exposure of the apparatus when it comes to impact of the external circumstances, i.e. potential covering, soiling or even breakage causing loss of the sensor-functionality, is practically eliminated.

Moreover, by arranging the detectors so that their optical plane of detection of light coincides with the plane of the light guide, an improved device may be achieved. More specifically, by this configuration, the amount of the detected ambient light as well as the angle at which ambient light is detected may be varied. This can be used to optimize the detection of the emitted light propagating inside the light guide. In particular, said parameters of the detected ambient light may be varied so as not to prevent detection of the sufficient amount of the emitted light propagating inside the light guide.

Furthermore, a third aspect of the present invention, as claimed in independent claim 8, provides a touch-sensing apparatus adapted to transmit light in order to remotely control a device, comprising a planar light guide having a first face that is exposed to ambient light, and a second, thereto opposite face, said planar light guide defining a touch sensing surface, The apparatus further comprises a plurality of light emitters arranged to emit light into the light guide for propagation by total internal reflection inside the light guide, wherein said emitters are distributed along the periphery of the touch surface, and a plurality of light detectors arranged to detect at least a portion of the light propagating inside the light guide. It further comprises a processor unit configured to, upon receiving input from the user, generate instructions for said device and emit said instructions via at least one of said emitters. Finally, the apparatus comprises means for outcoupling light out of the planar light guide such that the light generated by said emitter exits the apparatus.

In a fourth aspect, as claimed in independent claim 15, an apparatus that in a single entity unites the functionalities of the above-mentioned apparatuses is provided whereas a computer-usable medium comprising a computer program code is provided in a fifth aspect of the present invention.

Further advantages and features of embodiments will become apparent when reading the following detailed description in conjunction with the drawings.

BRIEF DESCRIPTION OF THE DRAWINGS

FIG. 1a is a perspective view of a front side of a conventional FTIR-based touch sensing apparatus, whereas

FIG. 2a is a side view of an exemplifying arrangement in a known touch sensing apparatus and FIG. 2b is a top plan view of the touch sensitive apparatus of FIG. 2a.

A diagram of FIG. 5 shows frequency spectra for different light sources.

An embodiment of one way of outcoupling the light signal from a touch-sensing apparatus adapted to transmit light in order to remotely control a device is schematically shown in FIG. 7.

Another embodiment of outcoupling the light signal from a touch-sensing apparatus adapted to transmit light in order to remotely control a device is schematically shown in FIG. 8.

DETAILED DESCRIPTION

Figure 1A:
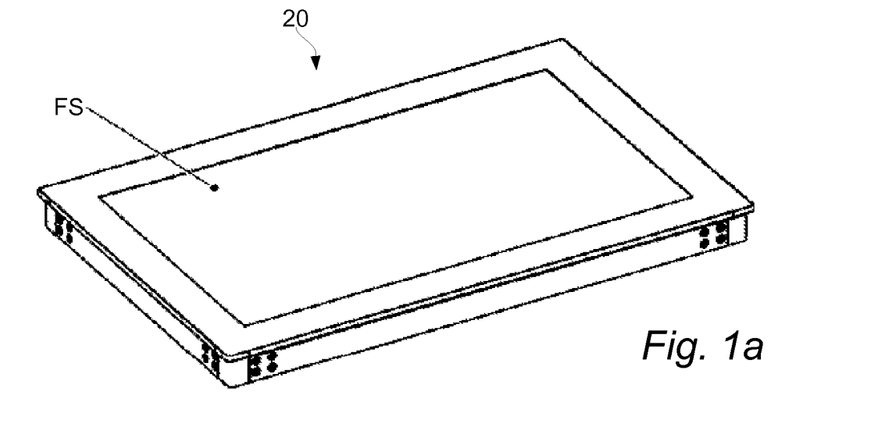
Figure 1B:
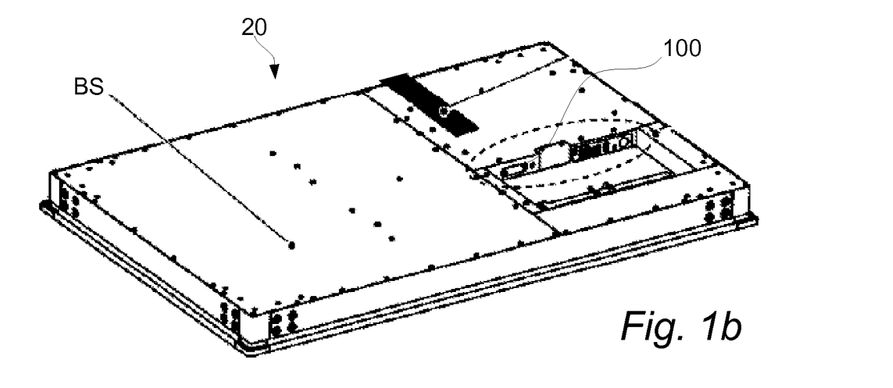
FIG. 1b shows a back side of such a device where a dedicated IR-sensor may be seen.

FIG. 1a is a perspective view of a front side (FS) of a conventional FTIR-based touch sensing apparatus 20 comprising a display element, whereas FIG. 1b shows a back side (BS) of such a device where a dedicated IR-sensor 100 may be seen.

Figure 2A:
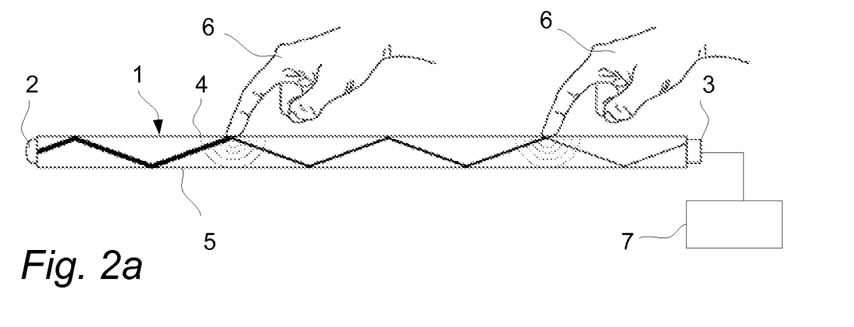

FIG. 2a is a side view of an exemplifying arrangement in a known touch sensing apparatus. The arrangement includes a planar light guide 1, a light transmitting arrangement comprising light emitters 2 and a light detection arrangement comprising light detectors 3. Emitters 2 and detectors 3 are here arranged opposite one another and are protected from direct ambient light. Emitters 2 and detectors 3 may be arranged to operate in visible light or IR-light, i.e. having wavelengths between 400 nm and 1 μm. The light transmissive guide 1 that allows propagation of light therein defines two opposite and essentially parallel faces 4, 5. In FIG. 2a, the guide 1 is rectangular, but it could also have other shapes. The first, upper, face 4 is exposed to ambient light. Ambient light enters into the guide, either directly or owing to contamination on the upper face. In this context, ambient light, i.e. light having UV-, visible and IR-light components, is the available light in a room, originating from both natural and artificial sources. Also, upper face is the one facing the user during normal use. Typically, the light propagates through the guide 1 by total internal reflection (TIR). As it may be seen in FIG. 2b, the detectors 3 are distributed along the periphery of the guide 1. Each detector 3 generates an output signal which is indicative of the energy of received light. Moreover, at least one of said detectors 3 is adapted to detect light emitted by an external device configured to emit light. In an embodiment, at least two detectors 3 are adapted to detect light emitted by an external device configured to emit light such that position of the external device relative the apparatus may be computed by means of triangulation. In another embodiment, at least two detectors 3 are adapted to operate as a time-of-flight camera and detect light emitted by an external device configured to emit light. This allows the position of the external device relative the apparatus to be computed by time-of-flight. In yet another embodiment, each detector 3 of the apparatus is adapted to detect light emitted by an external device configured to emit light. An apparatus of uttermost reliability when it comes to previously discussed impact of external circumstances on the functioning of the apparatus is hereby achieved. Moreover, inherent design of the apparatus enables the user desiring to remotely control the apparatus to aim in the general direction of the apparatus, i.e. precise targeting of a specific region of the front side of the apparatus is not required.

In an embodiment of the touch-sensing apparatus of the present invention, the light emitters 2 as well as light detectors 3 are arranged to emit respectively detect light in the infrared range. Here, it is easily apprehended that, given the complementary nature of their relationship and for optimal performance of the apparatus, detectors 3 detect in a range that approximates the emission range of the emitters 2. By way of example, this can be realized, in addition to appropriately setting the emitting wavelength, by adding a so called daylight filter to the respective detector such that light of wavelengths below 750 nm is effectively blocked from being captured by the detector. Such a daylight filter is foremost desirable so that the amount of ambient light being captured by the detectors 3 is kept at a minimum. Accordingly, only IR-component of the ambient light is captured by detectors 3. In conjunction herewith, many conventional touch-sensing apparatuses have an operative wavelength, i.e. wavelength of the light emitted by the emitters 2, within the IR-range. One non-limiting example is a FTIR-based device using an IR-light having the wavelength in the range 810-980 nm. By arranging the emitters 2 and the detectors 3 according to the above, the fact that conventional remote controls operate in the infrared range may be leveraged. More specifically, it is known in the art that a wavelength interval operatively used by standard remote controls spans between 830 nm and 940 nm (infrared range). Accordingly, when touch-sensing apparatus is provided with a daylight filter and operated in the infrared range, the detectors, although being most efficient at a specific wavelength, here the wavelength of the emitted light typically spanning between 810 nm and 980 nm, will detect light in a wide range. Consequently, if the apparatus is configured in accordance with the above, detectors 3 will always be able to detect a light signal generated by a standard remote control. As clearly shown, this additional functionality does not require inclusion of additional components. Conclusively, if certain preconditions are fulfilled, the invention at hand is particularly suitable for applications where a conventional remote control-technology is used for controlling the apparatus.

Figure 5:
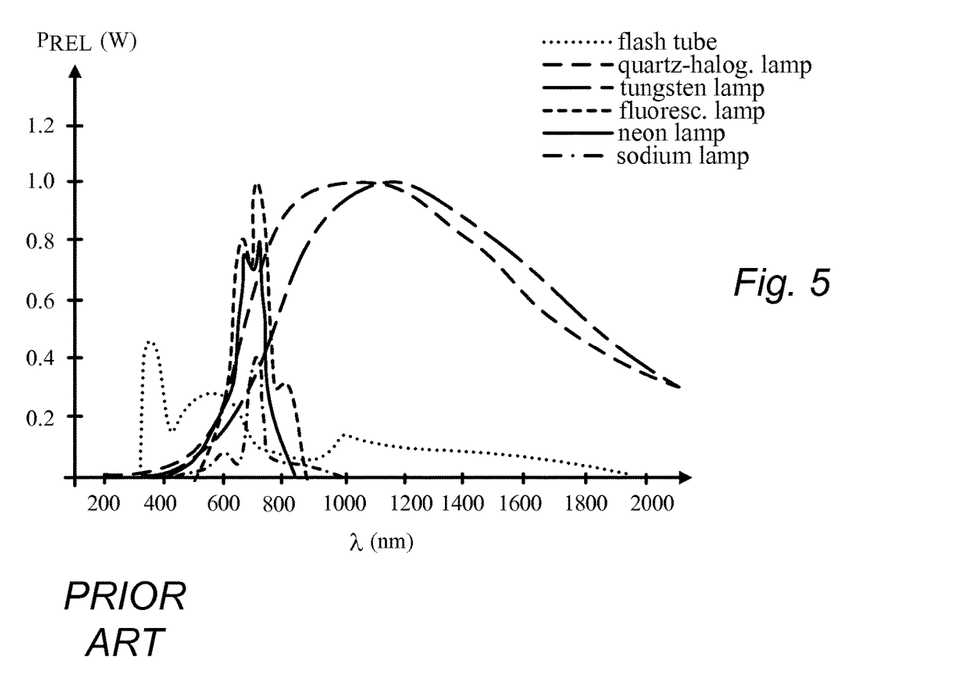

In another embodiment (not shown) at least one of said detectors is directly exposed to ambient light via a window provided in the first face of the planar light guide. In this way, dedicated ambient light detectors are provided. These can be used inter alia for continuous real-time determining of colour temperature of the ambient light source and subsequent automatic adjustment of the colour temperature of the reproduced picture. In this context, ambient light detected by such a dedicated ambient light detector is suitably manipulated in order to identify the type of light source, e.g. halogen, incandescent, fluorescent, LED, sunlight. More specifically, the temporal or spectral frequency behaviour of the uncorrupted ambient signal profile needs first to be analysed. The obtained temporal frequency profile of the ambient signal may, in order to determine a certain source of light, be compared to known profiles belonging to different ambient light sources. As explained in the accompanying text-box, curves of FIG. 5 represent characteristic wavelengths of different light sources. By comparing the identified temporal frequency with stored, tabulated temporal frequencies, the type of ambient light source may be determined. This information may subsequently be used to adjust specific picture-reproducing parameters of the apparatus, such as colour temperature, so as to enhance reproduction of the displayed picture.

Figure 3:
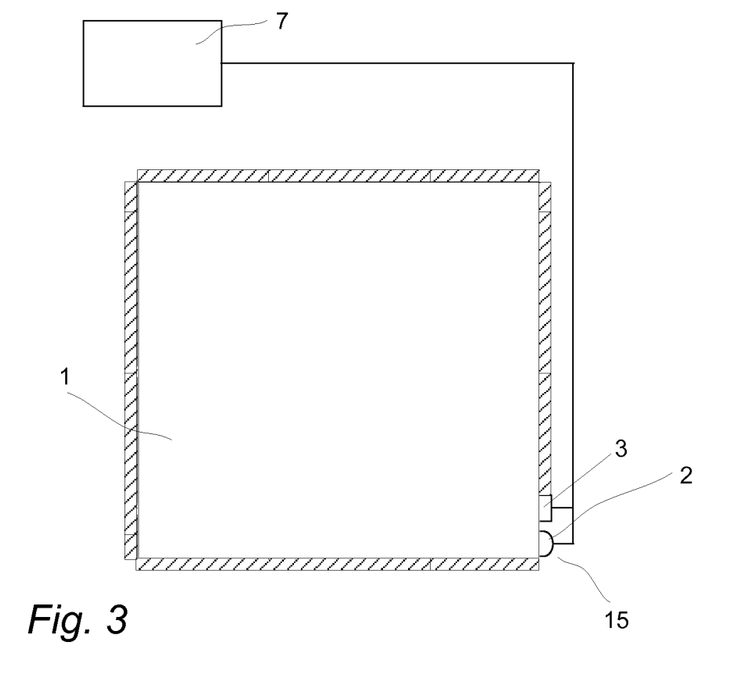
FIG. 3 is a schematical top view of the touch sensing apparatus according to the current invention showing one detector and one emitter that are directly exposed to ambient light.

In the same context and yet another embodiment, particularly suitable for use with IR-light and shown in a simplified manner in FIG. 3, one detector 3 and one emitter 2 may be arranged in pair, i.e. adjoining each other, and may be directly exposed to ambient light, preferably via a window 15 provided in the first face of the planar light guide 1. Here, remaining emitters/detectors (not shown, since protected from direct ambient light) are still present, although not directly exposed to ambient light. Thus, in addition to emitting/detecting IR-light associated with the light guide, the exposed pair emits (IR) and detects (IR and ambient) light in a direction perpendicular to the plane of the touch-sensing surface. Turning on an apparatus having this configuration and being set in a power saving mode by a mere hand movement is hereby made possible. Obviously, this requires that a processing unit 7 is suitably configured. Indeed, this configuration turns the apparatus into a basic motion detector.

Reverting to FIG. 2a, the light may be coupled into and out of the guide 1 directly via the edge portions of the guide where the emitter(s) respectively detector(s) are positioned. Alternatively, the detector(s) 3, while still being distributed along the periphery of the light guide, could be located below the second, lower, face 5 of the guide 1. At any rate, the detector(s) 3 are so arranged that their optical plane of detection of light coincides with the plane of the light guide 1.

Still in FIG. 2a, at least the upper face 4 of the guide 1 allows the propagating light to interact with a touching object 6, i.e. it defines a touch-sensing surface. When the object 6 is touching a touch sensing surface 4 part of the light may be scattered by the object 6, small part of the light may be absorbed by the object 6, and part of the light may continue to propagate unaffected. Thus, when the object 6 touches the top surface 4, the total internal reflection is frustrated (disturbed) and the energy of the transmitted light is decreased. This is the working principle of the previously mentioned FTIR-system.

In the same context, location of the touching object 6 may be determined by measuring the energy of light transmitted through the guide 1 on a plurality of detection lines. This may be done by e.g. operating a number of spaced apart light emitters 2 to generate a corresponding number of light sheets into the guide 1, and by operating the light detectors 3 to detect the energy of the transmitted energy of each light sheet. The operating of the light emitters 2 and light detectors 3 may be controlled by a data processing unit 7. The processing unit 7 is configured to process the signals from the light detectors 3 to extract data related to the touching object 6.

Figure 2B:
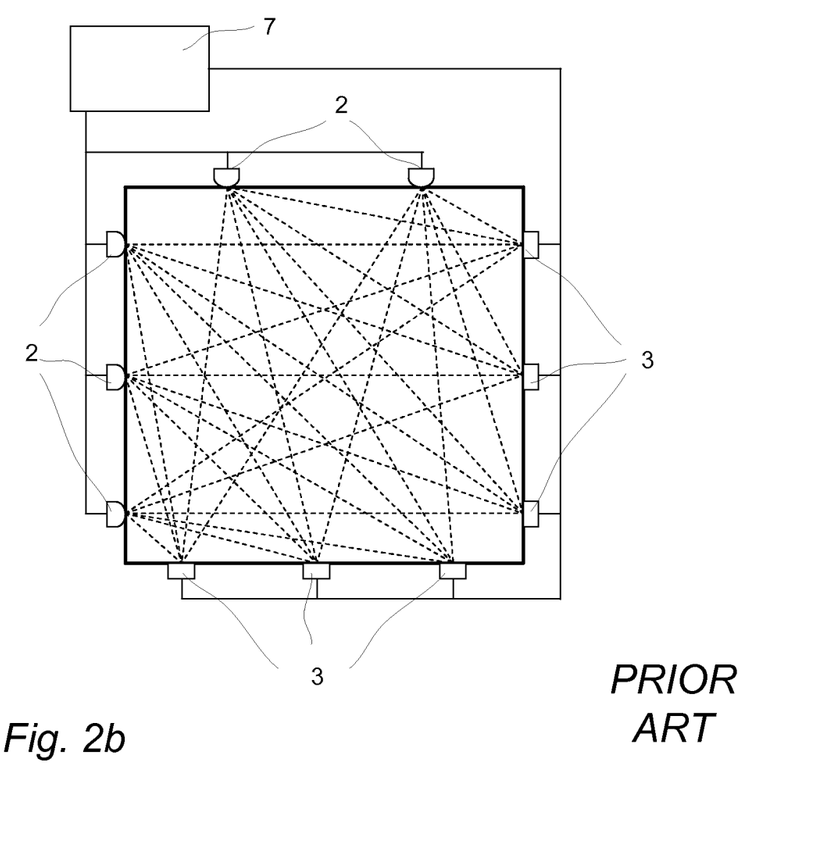

Turning now to FIG. 2b, it illustrates an embodiment of an FTIR system, in which each light sheet is generated by a respective light emitter 2 at the periphery of the panel 1. Each light emitter 2 generates a beam of light that expands in the plane of the panel 1 while propagating away from the light emitter 2. Arrays of light detectors 3 are located around the perimeter of the panel 1 to receive light from the light emitters 2 at a number of spaced apart outcoupling points within an outcoupling site on the panel 1. As indicated by dashed lines in FIG. 2b, each sensor-emitter pair 2, 3 defines a detection line. As mentioned in conjunction with FIG. 2a, the light detectors 3 may instead be placed at the periphery of the lower side 5 or the upper side 4 of the touch panel 1 and protected from direct ambient light propagating towards the light detectors 3 at an angle normal to the touch surface 4.

Depending on e.g. the configuration of the light detection arrangement, the electrical light signal(s) from the light detection arrangement will comprise different sets of measured values. An electrical signal from the light detection arrangement may comprise information from one light detector 3, or may comprise information from several light detectors 3. The processor unit 7 of the apparatus is configured to sample generated electrical signal such that a sampled signal is obtained, said sampled signal comprising a first time series containing data regarding ambient light and regarding light generated by the external device and a second time series containing data regarding touch information generated by contact with the touch sensing surface, regarding ambient light and regarding light generated by the external device, extract and improve data regarding touch information generated by contact with the touch sensing surface such that a third time series containing essentially only data regarding touch information generated by contact with the touch sensing surface is obtained, generate a first digital signal, reduce ambient light component of the first time series such that a fourth time series essentially containing only data regarding light generated by the external device is obtained, generate a second digital signal from the obtained fourth time series, said signal containing data regarding light generated by the external device.

The apparatus has so far been described when light is emitted into the guide 1 for detection of touches. Originally intended to be detected for use in compensating for background noise, the ambient light level is also detected by the detection arrangement. More specifically, ambient light is detected when no light from the light emitting arrangement is introduced into the guide 1. The light detection arrangement detects ambient light scattered into the guide 1 by contaminations on the touch surface. This scattered light propagates in the guide 1 by means of total internal reflection (TIR). Ambient light refracted, i.e. not scattered by contaminations on the touch surface, into the guide may also reach the detectors if it becomes so-to-say secondarily scattered in the guide itself. As is known in the art, behaviour of light when passing through a boundary between air and the material of the light guide (typically glass or polymer) is governed by Snell's law. Alternatively, the light detection arrangement detects ambient light passing through the panel without the need for a contamination of the surface.

As previously mentioned in conjunction with FIG. 2a, the detectors 3 of the light detection arrangement are so arranged that their optical plane of detection of light coincides with the plane of the light guide 1. Hereby, an improved device may be achieved. More specifically, by this configuration, the amount of the detected ambient light as well as the angle at which ambient light is detected may be varied. This can be used to optimize the detection of the emitted light propagating inside the light guide. In particular, said parameters of the detected ambient light may be varied so as not to prevent detection of the sufficient amount of the emitted light propagating inside the light guide.

A frame rate is defined as the frequency by which data from all relevant light detectors and light emitters is collected and touch coordinates are computed. During each frame, data regarding ambient light is also collected. To extract relevant data from the electrical signal(s) obtained from the light detection arrangement comprising one or several light detectors, the processing unit is configured to, by means of a sampling scheme, sample the electrical signal(s) such that a sampled signal is obtained. Said sampling scheme defines timing of a touch sample characterizing the generated touch information and a background sample characterizing ambient light and is suitable for sampling at the carrier frequency of the external device. In case of a remote control, as is widely known in the art, carrier frequency ranges between 33 and 55 kHz.

Figure 4:
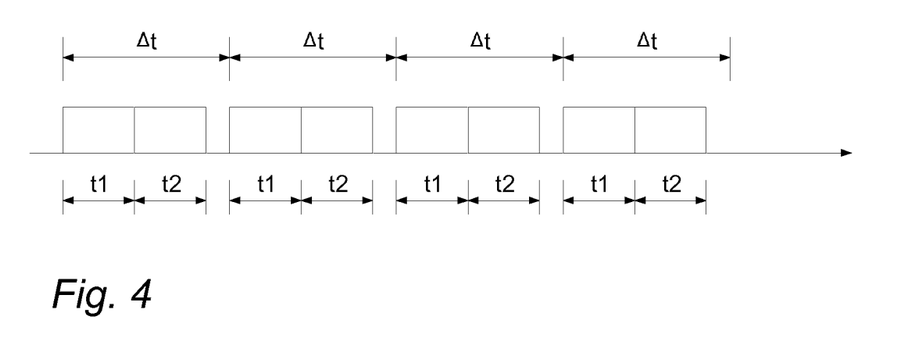
FIG. 4 schematically illustrates how the electrical signal is sampled in time series to distinguish periods with ambient light and touches from periods with only ambient according to one embodiment of the invention.

In FIG. 4, an illustration of a sampling scheme is shown, wherein the resulting sample comprises a first time series t1 comprising data regarding ambient light and regarding light generated by the external device, and a second time series t2 containing data regarding touch information generated by contact with the touch sensing surface, regarding ambient light and regarding light generated by the external device. The frame rate is indicated as $\Delta t$.

Figure 6:
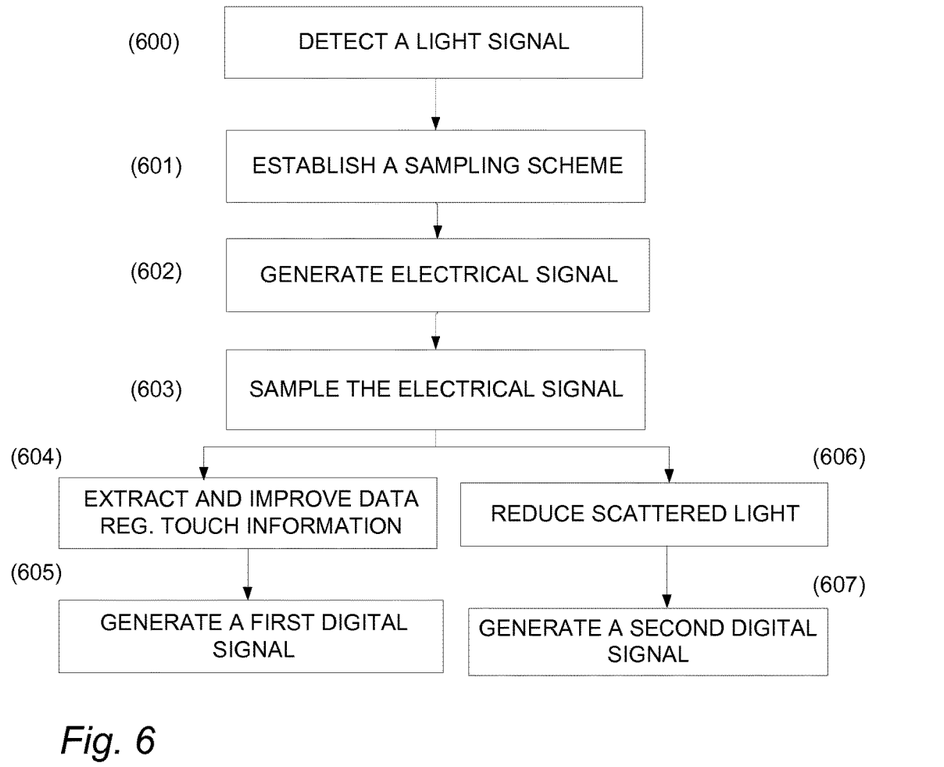
FIG. 6 shows a flow chart of the method for enabling control of a touch-sensing apparatus by an external device according to one embodiment of the invention.

FIG. 6 shows a flow chart of the method for enabling control of a touch-sensing apparatus by an external device according to one embodiment of the invention. Accordingly, in a first step of the method, a light signal is detected 600, whereupon sampling scheme that measures at least internally generated light containing touch information generated by contact with a touch sensing surface of the apparatus and ambient light is established 601. Said sampling scheme, illustrated in a non-limiting way in FIG. 4, defines timing of a touch sample characterizing the generated touch information and a background sample characterizing ambient light, said apparatus and said sampling scheme being suitable for sampling at the carrier frequency of the external device. Subsequently, at least one electrical signal is generated 602, said signal comprising at least data regarding the internally generated light containing touch information generated by contact with the touch sensing surface, ambient light and light generated by the external device. In next method step, said electrical signal is sampled 603 by means of the sampling scheme such that a sampled signal is obtained, said sampled signal comprising a first time series containing data regarding ambient light and regarding light generated by the external device and a second time series containing data regarding touch information generated by contact with the touch sensing surface, regarding ambient light and regarding light generated by the external device. In an embodiment where a plurality of electrical signals is generated, a plurality of first and second time series is obtained and these first and second time series are consequently used to obtain averaged, thus more reliable, first respectively second time series. Thereafter, the first time series is used in order to extract and improve data 604 regarding touch information generated by contact with the touch sensing surface such that a third time series essentially containing only data regarding touch information generated by contact with the touch sensing surface is obtained. A first digital signal is then generated 605. Independently from the extracting step 604, ambient light component of the first time series is reduced 606 such that a fourth time series essentially containing only data regarding light generated by the external device is obtained. Steps 604 and 606, and subsequent steps thereof, may be performed simultaneously or sequentially. This reducing of the ambient light component of the first time series is achieved by applying an, optionally adaptive, frequency filter through which only frequencies within a range are allowed to pass. Subsequently, a second digital signal is generated 607 from the obtained fourth time series, said signal containing data regarding light generated by the external device. It is to be noted that these method steps do not have to take place in the above order.

Furthermore, the method may be applied without substantial modifications for light of elective wavelength, obviously including white light as well. Moreover, a computer-usable medium comprising a computer program code configured to cause a processor unit to execute the method is also provided.

Finally, in a further step, the information content of the light signal generated by the external device is determined using data contained in said second digital signal.

As previously discussed, the inventive concept encompasses a touch-sensing apparatus adapted to transmit light in order to remotely control a device (not shown, but in all relevant structural aspects very similar to the related apparatus thoroughly discussed in conjunction with FIGS. 1-6). Said apparatus comprises a planar light guide having a first face that is exposed to ambient light, and a second, thereto opposite face, said planar light guide defining a touch sensing surface, a plurality of light emitters arranged to emit light into the light guide for propagation by total internal reflection inside the light guide, said emitters being distributed along the periphery of the touch surface, a plurality of light detectors arranged to detect at least a portion of the light propagating inside the light guide, a processor unit configured to, upon receiving input from the user generate instructions for said device and emit said instructions via at least one of said emitters and, finally, means for outcoupling light out of the planar light guide such that the light generated by said emitter exits the apparatus.

Figure 7:
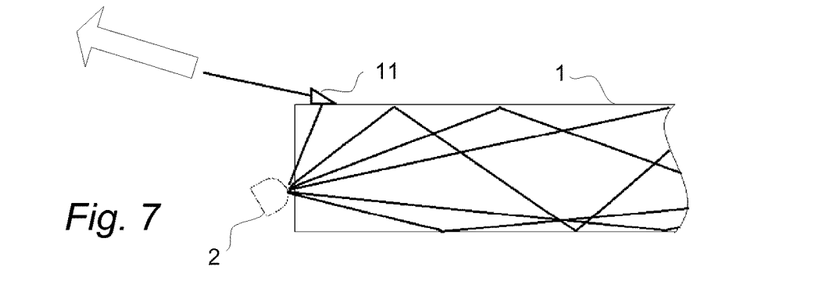

An embodiment of one way of outcoupling the light signal from a touch-sensing apparatus adapted to transmit light in order to remotely control a device is schematically shown in FIG. 7. In particular, portion of the emitted light is coupled out of the planar light guide 1 (arrow denotes direction of the outcoupled light) without having substantially propagated therein. This is realized by angling an emitter 2 relative the planar light guide 1 so that a portion of the emitted light exits the planar light guide via said window without substantially propagating in the guide and by positioning means 11 for refracting this light in said window. An example of such refracting means is a prism (shown greatly exaggerated in FIG. 7).

Figure 8:
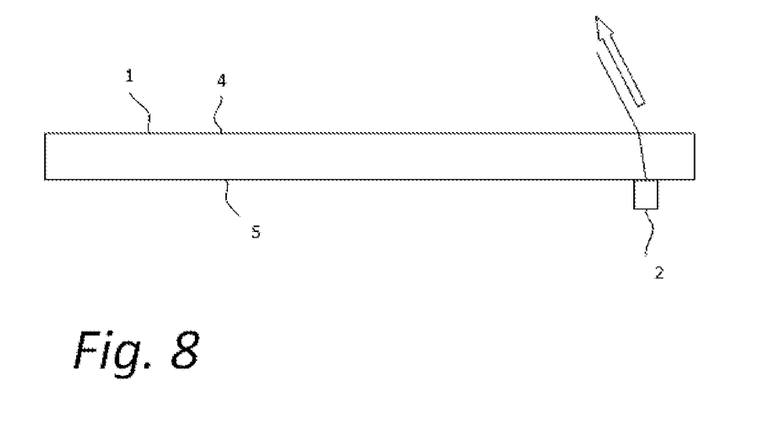

In an alternative way shown in FIG. 8 of outcoupling the light signal from a touch-sensing apparatus adapted to transmit light in order to remotely control a device, the light emitted by the emitter 2 is coupled into the light guide 1 through surface 5 and passes out of the light guide 1 through the top surface 4 at such an angle that it does not propagate through the panel by means of total internal reflection. In one embodiment where the emitter is optically coupled to the panel so that light enters the panel at a range of angles, light entering the panel at an angle too small to be internally reflected in the top surface 4 will pass out through the top surface of the panel and may be received by the remote device.

In an embodiment of the above, the touch-sensing apparatus is adapted to transmit light in order to remotely control a device (not shown), the touch-sensing apparatus having a light guide circumferentially surrounded by a housing and a portion of the housing is made from a light-transmissive material whereby direct optical communication between the inside of the planar light guide and the device to be controlled is enabled. In this way, a remote control-functionality is achieved by leaking out a portion of light generated by the emitter(s).

In an embodiment of the invention, transmission from the touch-sensing apparatus to the remote device or vice versa may be used to facilitate Li-Fi communication for Li-Fi routing, bridge, or repeater functionality. In another embodiment, the transmission from the touch-sensing apparatus to the remote device or vice versa may be used to facilitate high speed short range communication and/or handshaking or authentication with, for example, a smart phone device.

It is to be understood that an apparatus (not shown) that in a single entity unites principal functionalities of the respective above-discussed apparatus (sender-receiver configuration) as well as comprises any feature combination including features of both apparatuses is well encompassed by the spirit of the present invention. By way of example, light emitters and light detectors of such an apparatus could be arranged to emit respectively detect light in the infrared range. Moreover, in analogy with the discussion presented in conjunction with FIG. 3, at least one of said detectors and at least one of said emitters could be directly exposed to ambient light.

In the drawings and specification, there have been disclosed typical preferred embodiments of the invention and, although specific terms are employed, they are used in a generic and descriptive sense only and not for purposes of limitation, the scope of the invention being set forth in the following claims.

The invention claimed is:

1. A remotely controllable touch-sensing apparatus, comprising:
    a planar light guide having a first face exposed to ambient light such that the ambient light passes into the planar light guide and propagates, the planar light guide having a second face opposite to the first face, said planar light guide defining a touch sensing surface;
    a plurality of light emitters configured to emit light into the planar light guide for propagation by total internal reflection inside the planar light guide;
    a plurality of light detectors, each of the plurality of light detectors arranged to detect at least a portion of the emitted light propagating inside the planar light guide and at least a portion of the ambient light, said plurality of light detectors distributed along a periphery of the touch sensing surface such that an optical plane of detection of light coincides with a plane of the planar light guide, wherein
        at least one of said plurality of light detectors is configured to detect light emitted by an external device configured to emit light, and
        said at least one of said plurality of light detectors is further configured to generate at least one electrical signal in response to said light emitted by the external device; and
    at least one processor configured to execute computer-readable instructions to
        sample said at least one electrical signal to obtain a sampled signal, said sampled signal including a first time series and a second time series, the first time series containing data regarding the ambient light and data regarding the light emitted by the external device, and the second time series containing data regarding touch information generated by contact with the touch sensing surface, the data regarding the ambient light and the data regarding the light emitted by the external device,
        extract and improve the data regarding touch information generated by contact with the touch sensing surface to obtain a third time series containing essentially only the data regarding touch information generated by contact with the touch sensing surface,
        generate a first digital signal,
        reduce an ambient light component of the first time series to obtain a fourth time series essentially containing only the data regarding the light emitted by the external device, and
        generate a second digital signal from the fourth time series, said second digital signal containing the data regarding the light emitted by the external device.

2. The remotely controllable touch-sensing apparatus according to claim 1, wherein
    at least two of the plurality of light detectors are configured to detect the light emitted by the external device; and
    the external device is further configured to emit the light such that a position of the external device relative to the remotely controllable touch-sensing apparatus is computable by triangulation or time of flight.

3. The remotely controllable touch-sensing apparatus according to claim 1, wherein each of the plurality of light detectors is configured to detect the light emitted by the external device.

4. The remotely controllable touch-sensing apparatus according to claim 1, wherein
said plurality of light emitters are configured to emit infrared light; and
said plurality of light detectors are configured to detect infrared light.

5. The remotely controllable touch-sensing apparatus according to claim 4, wherein
said plurality of light emitters are configured to emit light having a wavelength between 830 nm and 940 nm; and
said plurality of light detectors are configured to detect light having the wavelength between 830 nm and 940 nm.

6. The remotely controllable touch-sensing apparatus according to claim 4, wherein said external device is configured to emit infrared light.

7. The remotely controllable touch-sensing apparatus according to claim 1, wherein at least one of said plurality of light detectors is directly exposed to the ambient light via a window provided in the first face of the planar light guide.

8. A method for enabling control of a touch-sensing apparatus by an external device, said method comprising:
detecting a light signal;
establishing a sampling scheme that measures at least ambient light and internally generated light containing touch information generated by contact with a touch sensing surface of the touch-sensing apparatus, wherein said sampling scheme defines timing of a touch sample characterizing the touch information generated by contact with the touch sensing surface and a background sample characterizing the ambient light, said touch-sensing apparatus and said sampling scheme being suitable for sampling a carrier frequency of the external device;
generating at least one electrical signal including at least data regarding the touch information generated by contact with the touch sensing surface, data regarding the ambient light and data regarding light generated by the external device;
sampling said at least one electrical signal according to the sampling scheme to obtain a sampled signal, said sampled signal including a first time series and a second time series, the first time series containing the data regarding the ambient light and the data regarding light generated by the external device, and the second time series containing the data regarding the touch information generated by contact with the touch sensing surface, the data regarding the ambient light and the data regarding light generated by the external device;
extracting and improving the data regarding touch information generated by contact with the touch sensing surface by using the first time series to obtain a third time series essentially containing only the data regarding touch information generated by contact with the touch sensing surface;
generating a first digital signal;
reducing an ambient light component of the first time series to obtain a fourth time series essentially containing only the data regarding light generated by the external device; and
generating a second digital signal from the fourth time series, said second digital signal containing the data regarding light generated by the external device.

9. The method according to claim 8, said method further comprising:
determining information content of the light generated by the external device using the data contained in said second digital signal.

10. The method according to claim 8, wherein said reducing an ambient light component of the first time series comprises:
applying a frequency filter through which only frequencies within a range are allowed to pass.

11. The method according to claim 10, wherein said frequency filter is adaptive such that said range is variable.

12. The method according to claim 8, further comprising:
generating a plurality of electrical signals;
obtaining a plurality of first time series and a plurality of second time series; and
obtaining averaged first time series and second time series based on the plurality of first time series and the plurality of second time series.

13. A non-transitory, tangible computer readable storage medium comprising a computer program code that, when executed by at least one processor, causes the at least one processor to perform the method according to claim 8.

* * * * *